United States Patent [19]

Lanier

[11] 4,008,375

[45] Feb. 15, 1977

[54] DIGITAL VOICE SWITCH FOR SINGLE OR MULTIPLE CHANNEL APPLICATIONS

[75] Inventor: Raymond H. Lanier, Hyattsville, Md.

[73] Assignee: Communications Satellite Corporation (COMSAT), Washington, D.C.

[22] Filed: Aug. 21, 1975

[21] Appl. No.: 606,828

[52] U.S. Cl. .............................. 179/1 VC; 179/1 P
[51] Int. Cl.[2] ......................................... H04B 15/00
[58] Field of Search ............ 179/1 VC, 1 P, 15 A, 179/15 AS, 1 SA; 325/402, 403

[56] References Cited

UNITED STATES PATENTS

| | | | |
|---|---|---|---|
| 3,801,747 | 4/1974 | Queffenlon et al. | 179/15 AS |
| 3,825,694 | 7/1974 | Penecaud | 179/15 AS |
| 3,832,491 | 8/1974 | Sculli et al. | 179/1 VC |
| 3,864,519 | 2/1975 | Diven | 179/1 VC |
| 3,882,458 | 5/1975 | Hoeschele et al. | 179/1 VC X |
| 3,927,268 | /1976 | Sculli | 179/15 BW |

*Primary Examiner*—Kathleen H. Claffy
*Assistant Examiner*—E. S. Kemeny
*Attorney, Agent, or Firm*—Sughrue, Rothwell, Mino, Zinn & Macpeak

[57] ABSTRACT

A digital voice switch for detecting voice PCM samples in the presence of noise samples is disclosed. The switch includes a digital variable threshold generating means which adapts the threshold level to changes in the noise level. Advantage is taken of the fact that, over a given interval of time T, speech will occur as random talk spurts separated by periods of silence, while noise (Gaussian distributed) will be continuous. This difference between speech and noise makes it possible to detect the noise level with respect to the voice switch threshold level.

8 Claims, 11 Drawing Figures

DIGITAL VOICE SWITCH FOR SINGLE OR MULTIPLE CHANNEL APPLICATIONS

BACKGROUND OF THE INVENTION

1. Field of the Invention

The present invention generally relates to voice switches, and more particularly, to a digital voice switch wherein the threshold level of the switch is made variable to adapt to any changes in the noise level on a communications channel.

2. Description of the Prior Art

Voice switches are known in the art as devices which distinguish between vocal sounds and noise carried by a communications channel. Devices of this nature have a number of uses. For example, a communications system may include $n$ voice input channels and $m$ voice output channels, where $n>m$. One such system is disclosed in the U.S. Pat. No. 3,927,268 Joseph A. Scuilli et al. to a common assignee with the present application. Voice switches are used to determine when there are vocal sounds on any of the $n$ input channels. Only those channels carrying vocal sounds at any instant are connected to an output channel.

Prior art voice switches compare samples of a signal on a channel with a fixed threshold level. If the signal is above the threshold level, it is assumed the signal represents voice, otherwise it is assumed that the signal represents noise. Many vocal sounds result in a signal which has its greatest magnitude near the beginning and tapers off toward the end of the sound. In voice switches, the large magnitude front end portion of the sound is usually detected, and the remainder of the sound is passed through the voice switch by using a hangover time for switch connections to turn on. For example, when speech is detected, the voice switch is turned on to pass detected samples of the channel signal. Once turned on, the voice switch will remain on for a hangover period to insure passage of all samples of the sound. A hangover time of 150 milliseconds has been considered suitable.

Typically, the voice detector detects speech by detecting a given number of consecutive samples in excess of the threshold value. Detection of four samples in succession has been considered suitable.

Clipping of the front end of the sound would occur if the voice switch passed only those samples occurring during the 150 millisecond period following detection of four consecutive samples in excess of the threshold. To minimize front end clipping, all samples are delayed a fixed amount after detection before being applied to the output of the voice switch. Consequently, the voice switch detects speed prior to the time the beginning of speech arrives at the point where the voice switch controls passage of the samples to the output terminal. A delay time of 4 milliseconds has been found to be suitable.

A problem with the prior art voice switches is that they often clip much of the speech of low level talkers. The fixed threshold used in this type of switch is usually set at a level to reach a compromise between noise triggering and speech detection. However, the level of speech varies substantially from speaker to speaker. For a speaker whose level is near or below the level of the threshold, the action of this voice switch will tend to produce excessive speech clipping.

SUMMARY OF THE INVENTION

The present invention avoids the problem of excessive clipping for low-level speakers by providing an adaptive variable threshold level. The invention recognizes the fact that, over a given interval of time $T$, speech will occur as random talk spurts separated by periods of silence, while noise (Gaussian distributed) will be continuous. This difference between speech and noise makes it possible to detect the noise level with respect to the voice switch threshold. If the noise level exceeds the threshold, noise triggering of the voice switch will occur. To detect this condition, the time interval $T$ is divided into equal subintervals $\tau$. $N_\tau$ represents the number of PCM samples that exceed the threshold in a subinterval $\tau$. If the values of $N_\tau$ tend to be non-uniform over the time interval $T$, then it is assumed that active speech is present. If the values $N_\tau$ tend to be uniform over the time interval $T$, then it is assumed that noise is present. If $N_\tau$ is in a first predetermined range, the threshold is increased by a first increment. If $N_\tau$ is in a second, higher range, the threshold is increased by a second, larger increment. In either case, the threshold is increased in level until $N_\tau$ appears non-uniformly distributed. A minimum amount of noise triggering must be tolerated in order to eliminate noticeable clipping of low-level speech signals. Hence, $N_\tau$ must exceed a predefined minimum level before a decision is made regarding its distribution. If the threshold is increased too far above the noise level, noticeable speech clipping will occur. To detect this condition, a threshold zone is introduced. $N_z$ represents the number of samples that exceed the lower level of this zone in a given interval of time. If $N_z$ falls below a minimum magnitude, then it is assumed that the peak noise level is below the zone. When this condition occurs, the zone is lowered. Once the conditions for increasing and decreasing the threshold are satisfied, the peak noise level should fall within the zone. The advantage of the threshold zone over a single threshold level is that it is possible to accurately determine the peak noise level while transmitting a minimum of noise samples. This is because the peak level of the noise is detected within the zone which buffers the noise peaks from the threshold decision level. The maximum threshold level is determined by systems considerations and the minimum allowable signal to noise ratio. The minimum threshold level is determined such as to accommodate the lowest level talkers.

BRIEF DESCRIPTION OF THE DRAWINGS

The specific nature of the invention, as well as other objects, aspects, uses and advantages thereof, will clearly appear from the following description and from the accompanying drawing, in which.

DESCRIPTION OF THE PREFERRED EMBODIMENT

Figure 1:
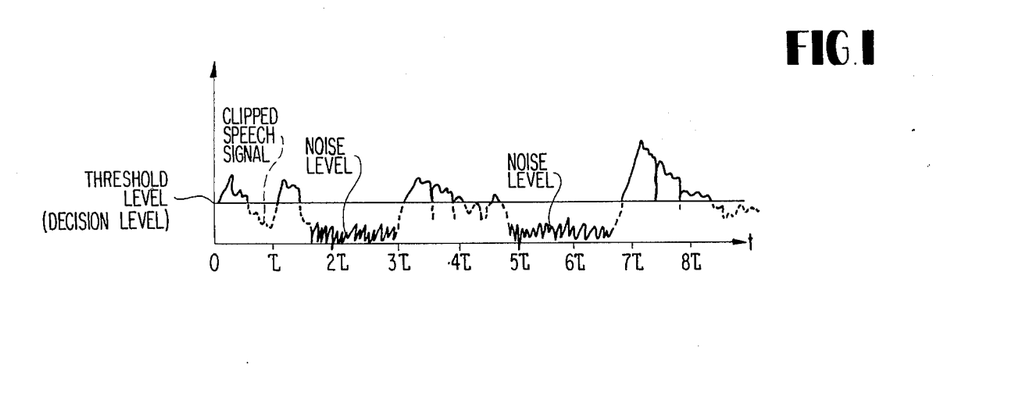
FIG. 1 is a graphical representation of the situation where the threshold level is adjusted too high thus avoiding excessive noise triggering but resulting in low level speech signals being noticeably clipped.
Figure 2:
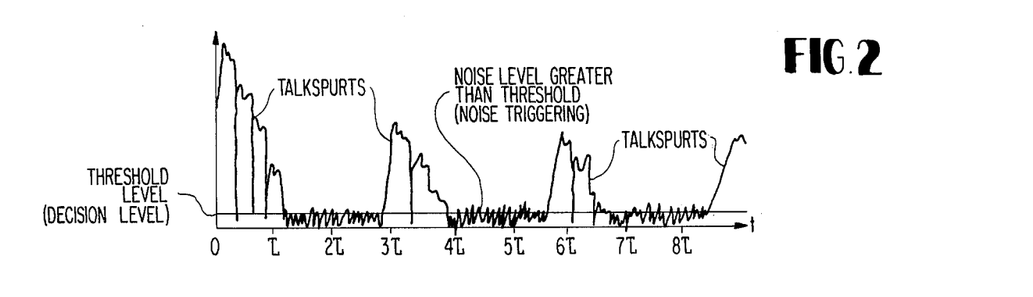
FIG. 2 is a graph illustrating the situation where the noise exceeds the threshold of the voice switch, resulting in noise triggering.
Figure 3:
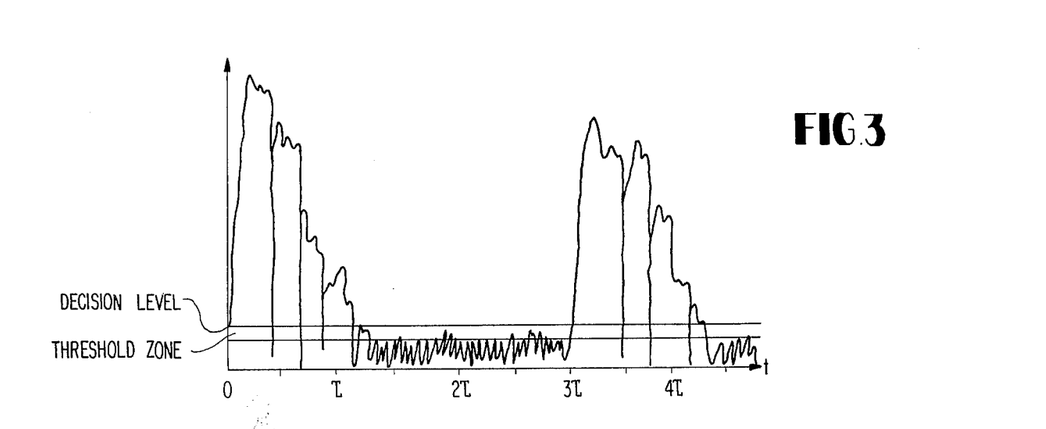
FIG. 3 is a graph illustrating the threshold zone employed in the present invention.

In prior art digital voice switches, it was typical to assume that if four consecutive PCM samples were greater in magnitude than a fixed threshold, then active speech was present in a communications channel. The effectiveness of this type of voice switch has been found to be dependent on the variation in noise level. If the threshold were adjusted sufficiently high to avoid excessive noise triggering, then low level speech signals would be noticeably clipped. This situation is illustrated in FIG. 1. On the other hand, if the noise were to exceed this threshold, noise triggering would occur as illustrated in FIG. 2. Those skilled in the art will recognize that it is desirable to establish the threshold level just above the noise level. In order to do this, the present invention introduces a threshold zone as illustrated in FIG. 3.

The present invention recognizes that speech occurs as random talk spurts separated by periods of silence, whereas noise is relatively continuous. To detect noise, a time interval T of, say 4 seconds, is divided in equal subintervals $\tau$ of say 0.5 seconds. The number $N_\tau$ of PCM samples that exceed the threshold in each subinterval is then counted. If the values of $N_\tau$ tend to be non-uniform over the interval T, then it is assumed that active speech is present. If, on the other hand, the values of $N_\tau$ tend to be uniform over the time interval T, then it is assumed that noise is present. If $N_\tau$ is in a first predetermined range, the threshold is increased by a first increment. If $N_\tau$ is in a second, higher range, the threshold is increased by a second, larger increment. In either case, the threshold is increased in level until $N_\tau$ is non-uniformly distributed. To maintain the threshold level just above the noise level, the number $N_z$ of samples that exceed the lower level of the threshold zone in a given interval of time is counted. If $N_z$ falls below a minimum magnitude, then it is assumed that the peak noise level is below the zone. When this condition occurs, the threshold zone is lowered. Once the conditions for increasing and decreasing the threshold are satisfied, the peak noise level should fall within the threshold zone.

Figure 4A:
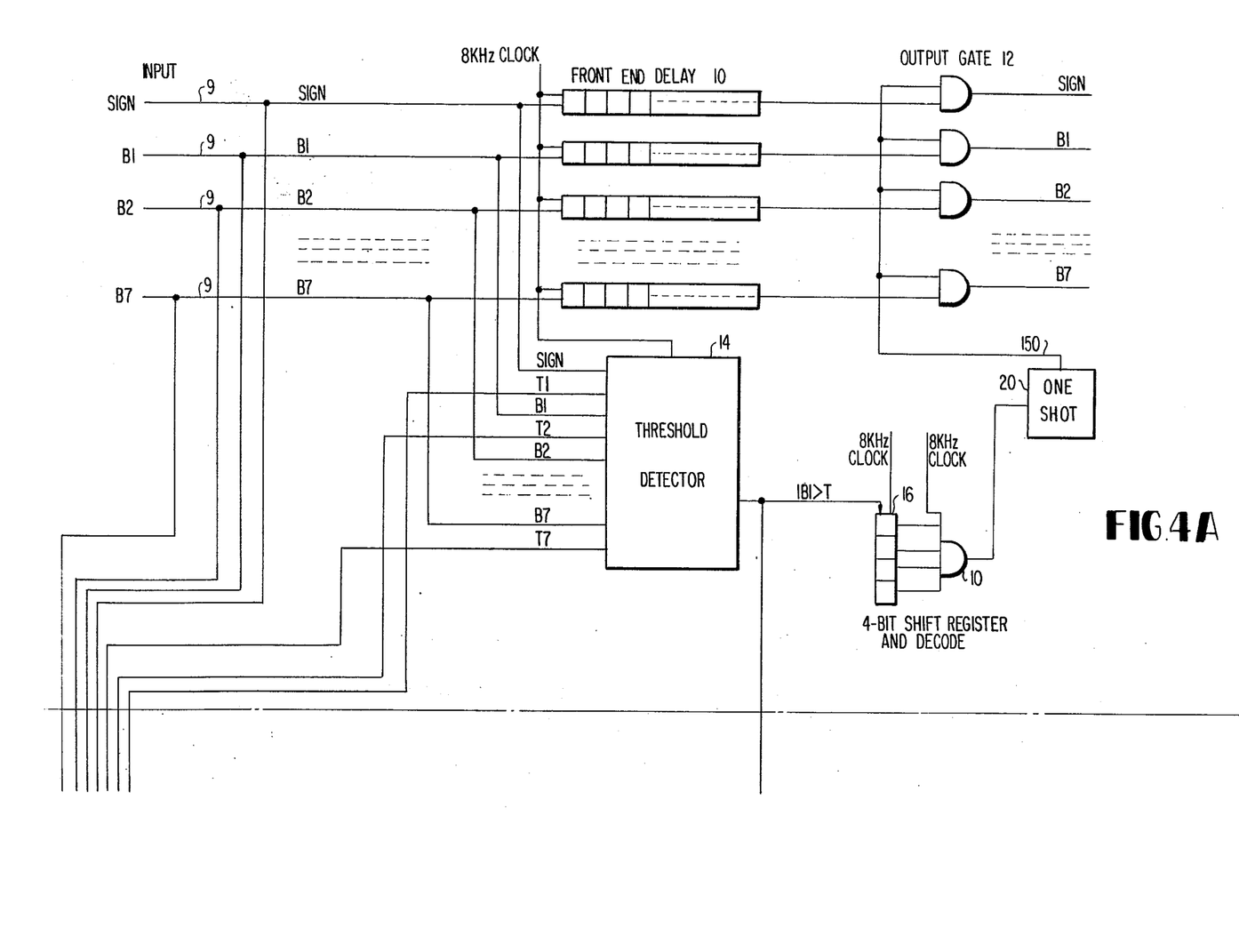
FIGS. 4A and 4B taken together is a block diagram of a preferred embodiment of the present invention.

A preferred embodiment of the digital voice switch which accomplishes the foregoing results will now be described. As is conventional in a digital communications system which transmits voice information in digital format, the analog voice information is applied to a conventional PCM device and sampled, typically, at an 8 KHz rate, each sample being subsequently converted into an 8-bit digital sample. In accordance with the embodiment to be described herein, the 8-bit samples comprising 7 bits of magnitude and one sign bit are applied to the digital voice switch. The 8 bits are applied in parallel at input line 9 as indicated in FIG. 4A. The negative numbers are in two's complement form, as is conventional. For example, the negative number −1 would be represented by a binary 1 sign bit and 7 binary 1 magnitude bits.

The switching portion of the digital voice switch comprises front end delay means 10, including a serial shift register for each of the bit positions of the samples, a threshold detector 14, 4-bit shift register 16, AND gate 18, hangover 1-shot means 20, and output gates 12. The samples are applied to the input terminals of the several shift registers making up the front end delay means 10. The samples are clocked into the shift registers by an 8 KHz clock. Each of the shift registers of the front end delay means has a sufficient number of stages to provide a 4 millisecond delay for reasons described above. The delayed samples are applied to output gates 12. The output gates are turned on to pass voice samples and turned off to block the passage of non-voice or noise samples. Consequently, an all 0 output will occur at the output gates 12 in the absence of speech.

The samples are also applied to a threshold detector 14, along with a digital representation of the threshold level. Since the threshold level will always be positive, it is not necessary to provide a sign bit for the digital threshold value. The threshold detector 14 compares the magnitude of the sample with the threshold level and provides a binary 1 output if the magnitude of the sample exceeds the threshold level. Each binary 1 output from the threshold detector 14 is clocked by an 8 KHz clock into 4 bit serial shift register 16. If 4 successive samples exceed the threshold level, the shift register 16 will be completely filled with binary 1 bits thereby fully energizing AND gate 18 which passes a binary 1 output to the triggering input of one-shot means 20.

One-shot means 20 is a conventional single shot retriggerable device having a 150 millisecond hangover time. Thus, the output from one-shot 20 will rise to its active level upon triggering and will decay to its non-active level 150 milliseconds after the last received trigger. For example, if the one-shot receives two trigger inputs spaced 50 milliseconds apart, it will provide an active output for 200 milliseconds. The active output of one-shot 20 energizes output AND gate 12 to pass the delayed samples to the output terminal.

Figure 5:
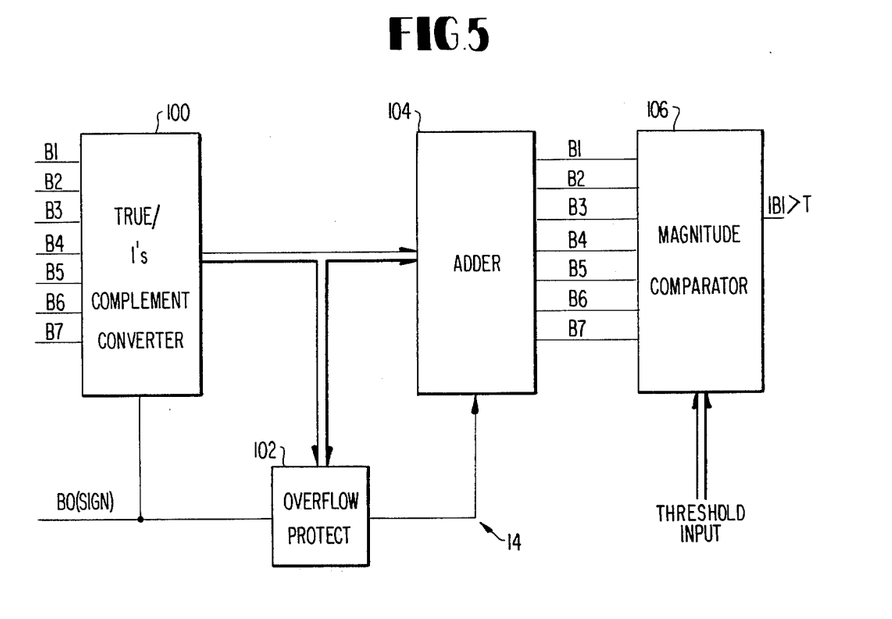
FIG. 5 is a block diagram of a typical binary threshold comparator adapted to compare the magnitudes of positive and negative binary numbers with a threshold value.

One example of a suitable threshold detector 14 is illustrated in FIG. 5 and comprises a true or one's complement converter 100, an overflow protector 102, binary adder means 104, and magnitude comparator 106. The overflow protector 102 is needed because of the nature of binary two's complement information. In general, positive samples are passed directly through converter 100 and adder 104 and compared in a conventional magnitude comparator with the threshold input. On the other hand, negative numbers are converted into their positive equivalents and passed to the magnitude comparator in order to compare the magnitude of the negative sample with the threshold input to the magnitude comparator. The function of the overflow protector 102 is simply to detect when a one-bit should be added to the least significant bit of the sample applied to the adder. When the sign bit is 0, signifying a positive value sample, the 7 magnitude bits of the sample are passed directly to the input of the adder. The 0 value of the sign bit is also detected by the overflow detector 102 which provides a 0 output bit. Consequently, in this case, nothing is added to the 7 magnitude bits, and they appear unaltered at the output of adder 104. If, on the other hand, the sign bit is a one, signifying a negative value sample, all 7 bits of the sample are inverted resulting in the one's complement appearing at the input to adder 104. This one's complement of the 7 bits is also applied to the overflow protector 102. If the overflow protector 102 detects a negative sign bit and also detects that the sample is not a maximum negative value, the overflow protector 102 will provide a binary one output which is added to the least significant bit position of the 7 bit input to adder 104. The resulting output from the adder will be the two's complement of the negative valued sample. In the special case where the sample is the maximum negative value, the output from converter 100 will be 7 binary one's. The combination of 7 binary one's plus a binary one sign bit is detected by the overflow protector 102 which provides a zero output. Thus, in this special case, there is nothing added to the one's complement of the sample.

Referring back to FIG. 4A, the portion of the voice switch described thus far is conventional. The improvement provided by the subject invention is in the apparatus for generating the threshold level. In the prior art, the threshold level was a fixed value, whereas in accordance with the present invention, the threshold level is adaptive and varies almost continuously throughout operation. The threshold value is held in a latch 68 and is altered and at least checked each half-second as will appear more fully hereafter. The selection of a half-second as the given time-period is not critical. However, it appears to be a good selection for counting the number of times which the threshold is exceeded by the samples.

Each time a sample exceeds the threshold level, a binary one output from threshold detector 14 is applied to the input terminal of counter 42. Counter 42 is a 12-bit counter which accumulates the input pulses and is reset to zero every half-second by a 2 Hz clock. The stages of counter 42 are connected to comparators 44 and 46. Comparators 44 and 46 are conventional devices which compare the state of the counter 42 with preset numbers. In the specific example described, comparator 44 compares the state of the counter with a fixed count of 200. Comparator 46 compares the state of the counter 42 with a fixed count of 2048. Although not shown, comparators 44 and 46 are activated or gated on by the same 2 Hz clock which resets counter 42. However, as will be apparent to anyone of ordinary skill in the art, the 2 Hz clock is delayed slightly after activating comparators 44 and 46 before resetting counter 42.

It will be appreciated from the foregoing that the count in counter 42 is the number $N_\tau$ of the PCM samples which exceed the threshold in subinterval $\tau$, where $\tau = 0.5$ seconds. Comparators 44 and 46 determine whether the count $N_\tau$ is in one of two ranges which are defined as follows:

Range 1: $200 < N_\tau \leq 2048$
Range 2: $N_\tau > 2048$

These ranges are used to decide whether or not $N_\tau$ is uniformly distributed over the time interval T where T = 4 seconds. In order for the threshold to increase, $N_\tau$ must stay in range 1 or range 2, but not both for a period of 4 seconds. If a channel has a value of $N_\tau$ in range 1 for 8 consecutive intervals of $\tau$, it will be detected by the 8-bit shift register 32 and AND gate 34. Shift register 32 is loaded by the output of AND gate 48. If, during a half-second subinterval $\tau$, the count in counter 42 is greater than 200 or less than or equal to 2048 corresponding to range 1, both comparators 44 and 46 will provide binary 1 outputs to the AND gate 48 which in turn provides a binary 1 input to shift register 32. AND gate 34 provides a binary 1 output only when all stages of the 8-bit shift register 32 are set to binary one's. The output of AND gate 34 is connected to the upper input of decoder 50.

If a channel has a value of $N_\tau$ in range 2 for 8 consecutive intervals of $\tau$, this will be detected by the 8-bit shift register 28 and AND gate 30. More specifically, if during a half-second counter 42 counts to greater than 2048, comparator 46 will provide a binary 1 to the input of 8-bit shift register 28. ANd gate 30 provides a binary 1 output to the middle input of decoder 50 only when all stages of the shift register 28 are set to binary one's.

The output of AND gate 34 is a command to increase the threshold level by $1_2$ ($1_{base\ 2}$), and the output of AND gate is a command to increase the threshold level by $3_2$. These values are relative to a threshold represented in a 6-bit binary code and a signal represented in an 8-bit binary code.

Figure 4B:
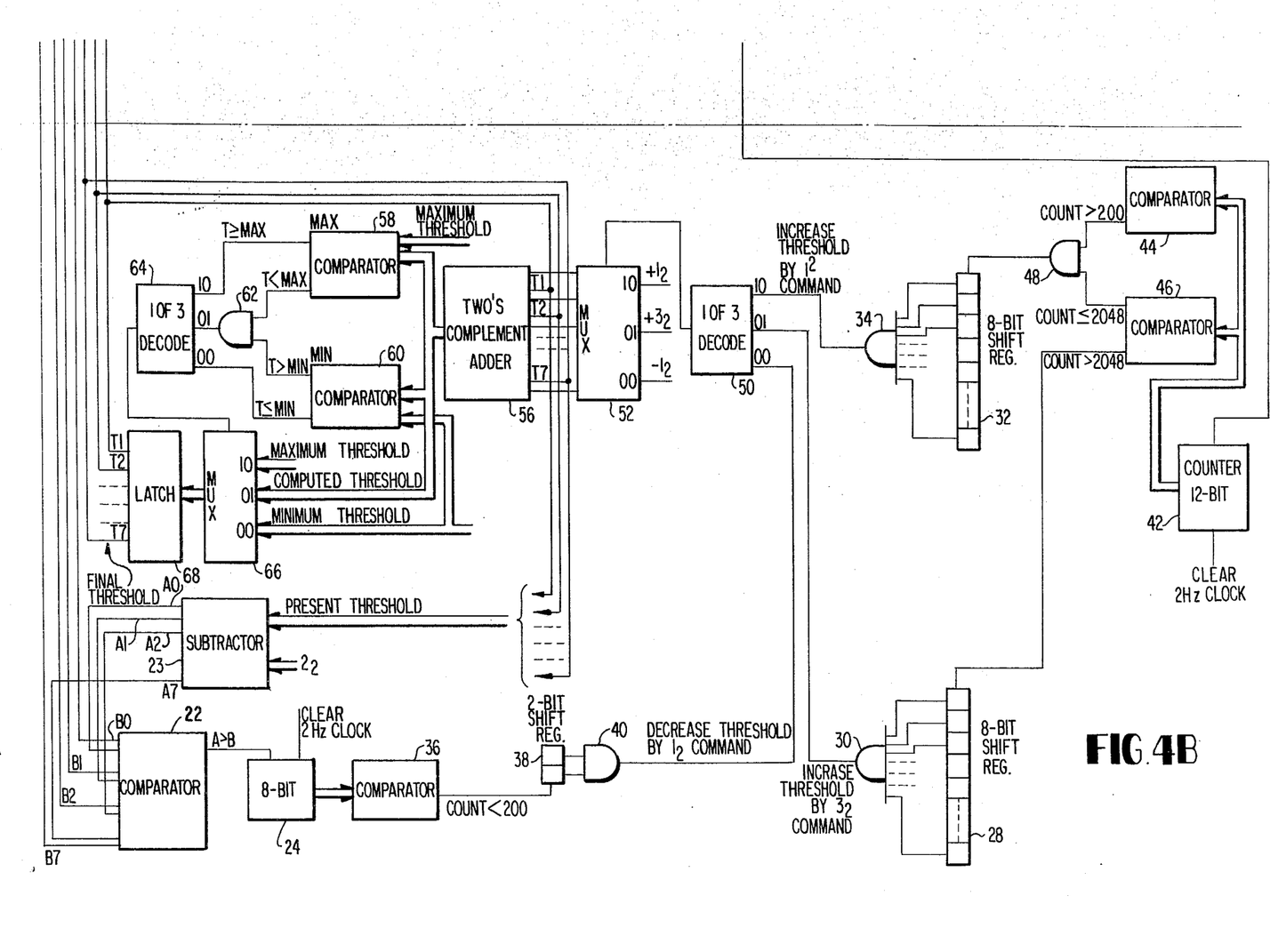

In order to decrease the threshold, the incoming PCM samples on lines 9 are compared to a level $2_2$ units below the present threshold. This is the lowest level in a threshold zone having a level range of $2_2$. The subtractor 23 and comparator 22 perform this function. More specifically, the present threshold from latch 68 is supplied as one input to subtractor 23, and the other input is hardwired to subtract $2_2$ from the present threshold. The outputs A0, A1, . . . A7 of subtractor 23 are supplied to comparator 22. The input PCM samples supplied to comparator 22 are designated as B0, B1, . . . , B7, and the comparator provides a binary 1 output only if A<B. This output is supplied to an 8-bit counter 24 which is reset on 0.5 sec. intervals by the 2 Hz clock. Counter 24 accumulates the number of PCM samples that exceed in magnitude the lower level of the threshold zone during a subinterval $\tau$. If the value in counter 24 is less than 200, comparator 36 will provide a binary 1 output to a 2-bit shift register 38. Shift register 38 and AND gate 40 detect when the count in counter 24 is less than 200 for two consecutive intervals of $\tau$. When this condition is detected, AND gate 40 provides a binary 1 output to the lower input of decoder 50. The output of AND gate 40 represents a command to decrease the threshold by $1_2$.

As will be apparent, only one and perhaps none of the three inputs to decoder 50 carries a binary 1 bit. The output of decoder 50 may be a 2-bit code representing which, if any, of the three input lines carries a binary 1. The 2-bit code from decoder 50 gates 1 of the three hard-wired input values through multiplexer 52 for subsequent addition to the present threshold level. The values to be added to the present threshold level are, respectively, $+1_2$, $+3_2$, $-1_2$, or 0. Each of these values is hard-wired in binary form into the multiplexer 52. The output of decoder 50 gates only 1 of the hard-wired binary values through the multiplexer to be subsequently added to the threshold value.

Figure 6:
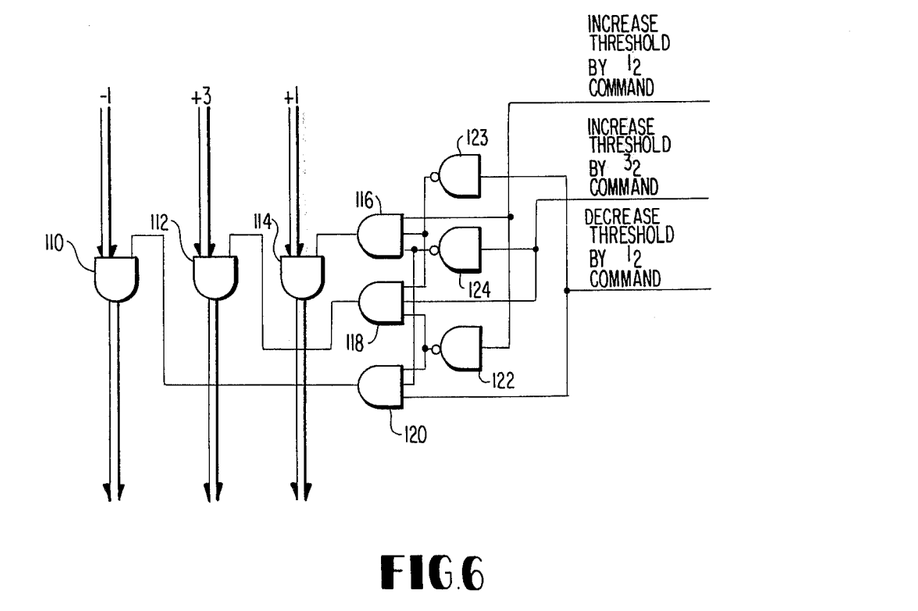
FIG. 6 is a logic diagram of a circuit suitable for use as a decoder and multiplexer combination of FIG. 4B.

Decoder 50 and multiplexer 52 may take many conventional forms. One simple example of elements which are connected to make up the combination of decoder 50 and multiplexer 52 is illustrated in FIG. 6, where the binary numbers representing $-1$, $+3$, and $+1$, respectively, are applied as inputs to AND gates 110, 112 and 114. The outputs from these AND gates represent the output from multiplexer 52. All of the outputs may be applied through an OR gating means not shown. The increase threshold by $1_2$ command from AND gate 34 is applied directly to AND gate 116 and through inverter 122 to AND gates 118 and 120. Thus, a binary 1 on this command enables AND gate 116 while inhibiting AND gates 118 and 120. The increased threshold by $3_2$ command is supplied directly to AND gate 118 and through inverter 124 to AND gates 116 and 120. The decrease threshold by $1_2$ command is applied directly to AND gate 120 and through inverter 123 to AND gates 116 and 118. A binary 1 output from AND gate 116 enables AND gate 114, a binary 1 output from AND gate 118 enables AND gate 112, and a binary 1 output from AND gate 120 enables AND gate 110. Although timing means is not shown, it will be understood that the 2 Hz clock may be additionally applied to the AND gates 110, 112 and 114, after a slight delay, to provide the necessary timing sequence for the operation. In fact, timing throughout the variable threshold circuitry may be controlled by the 2 Hz clock with various slight delays to ensure that the circuitry providing the input pulses to any given device has had time to settle before the clock is applied to that device.

Referring back to FIG. 4B, the output of multiplexer 52 is applied as one of the inputs to a conventional two's complement adder 56. The other input to adder 56 is the present threshold value from latch means 68. The output of the adder 56 represents a new computed threshold value which will be the new threshold provided it does not exceed a maximum fixed threshold or is not below a maximum fixed threshold. The output of adder 56 is applied to comparators 68 and 60, whose outputs in turn are applied to AND gate 62 and decoder 64. The output of decoder 64 is applied to a multiplexer 66. The combination of comparators 58 and 60, AND gate 62, decoder 64, and multiplexer 66 is preferably, and may be exactly, the same as the combination previously described of comparators 44 and 46, AND gate 48, decoder 50, and multiplexer 52. The only difference is in the value of the input applied to the comparators and the multiplexer. As seen from FIG. 4B, comparator 58 has a maximum threshold applied thereto, comparator 60 has a minimum threshold applied thereto, and the three binary inputs to the multiplexer are, respectively, the maximum threshold value, the computed threshold out of adder 56, and the minimum threshold. If the output of adder 56 is equal to or greater than the maximum fixed threshold, a binary 1 output from comparator 58 will be applied to the upper input of decoder 64, which provides an output signal that energizes multiplexer 66 to pass the maximum threshold binary value therethrough to the latch means 68. If the output from adder 56 is equal to or less than the minimum fixed threshold level, a binary 1 output from comparator 60 will be applied to the lower input terminal of decoder 64, whose output energizes multiplexer 66 to pass the binary number representing the minimum threshold therethrough to latch means 68. If, on the other hand, the output of adder 56 is between the maximum and minimum values, AND gate 62 will be energized to provide a binary 1 input to the middle input terminal of the decoder 64. The output of decoder 64 will then energize multiplexer 66 to pass the computed threshold value out of adder 56 through multiplexer 66 to latch means 68. Thus, the threshold level stored by latch means 68 will be updated every half-second.

It will be apparent to anyone of ordinary skill in the art that, since the threshold level is adaptive, it makes no difference what the initial value stored in latch means 68 is when the system is first turned on. It will immediately rise or fall to the adaptive level.

Figure 7A:
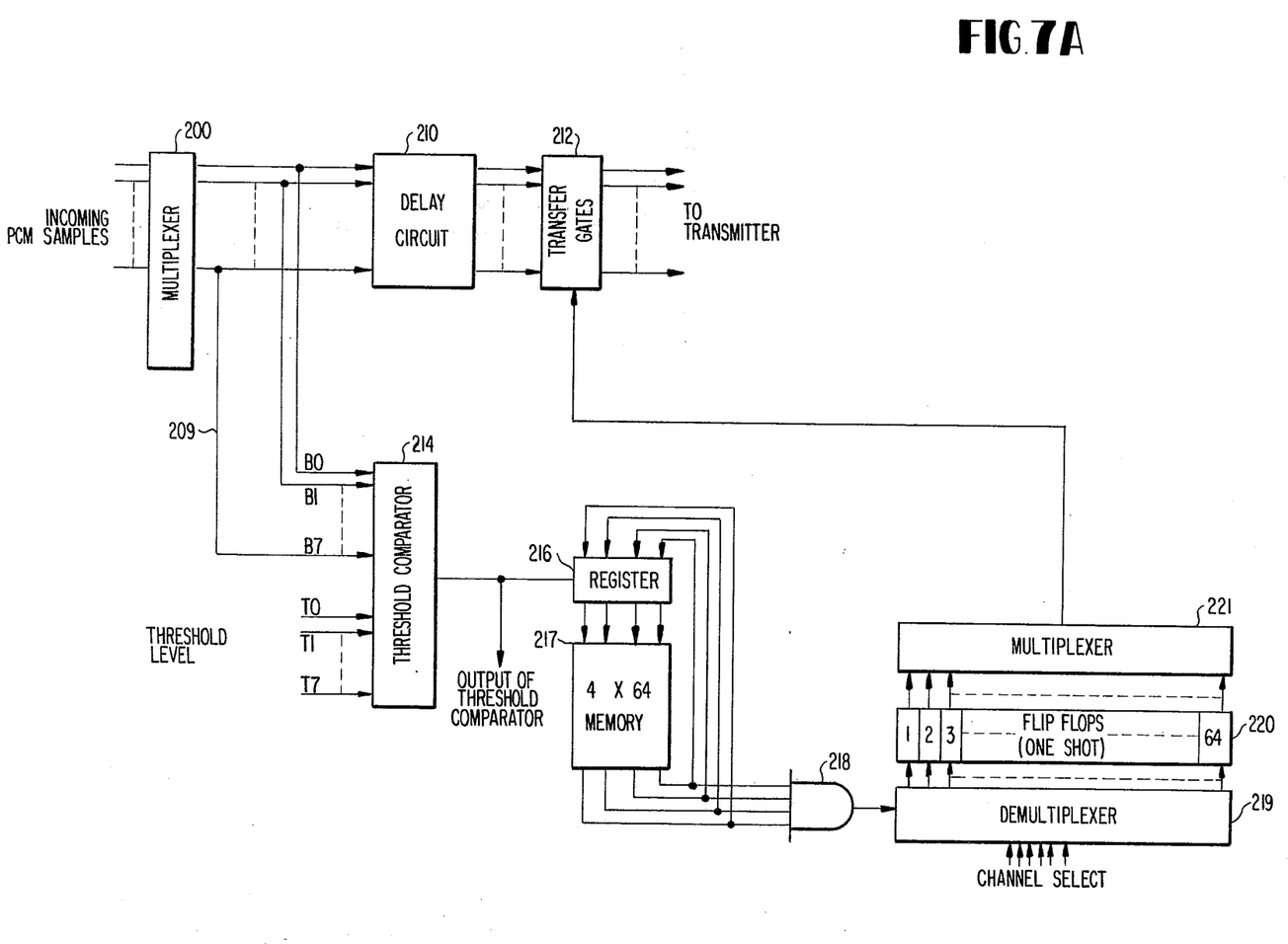
FIGS. 7A and 7D are block diagrams showing how the preferred embodiment of the present invention can be adapted to operate on multi-channel voice PCM data.

Although the adaptive threshold voice switch according to the present invention has been described above in connection with a single PCM channel of voice data, it will be apparent that the invention can be used with a line carrying multiplexed voice PCM samples. The techniques described above are suitable for a multiplexed channel, the only difference being in the need for some duplicative circuits, memory devices for storing the values held in the various counters and latches, and a slightly different timing arrangement to accommodate the multiplexed voice PCM samples. The modification of the adaptive threshold voice switch for multiplexed voice PCM samples is illustrated in FIGS. 7A to 7D. As shown in FIG. 7A, a plurality of voice PCM samples are applied to a conventional multiplexer 200. As is conventional, voice samples on each input line appear at the 8 KHz rate, but they are multiplexed onto the output line at a rate of $n \times (8\ \text{KHz})$, where $n$ is the number of channel inputs to multiplexer 200. Thus, for example, if there are 64 input channels supplied to multiplexer 200, voice samples appear at the output at a 512 KHz rate. Timing is provided by a 512 KHz clock, which may be derived from the 8 KHz clock indicated in FIG. 4A. In other words, each period of the 8 KHz clock is divided into 64 equal segments. Each segment controls the activity of the voice switch in connection with voice samples from a particular input line. The 2 Hz clock referred to in FIG. 4 would be converted to a 128 Hz clock for the same reason. The input samples are applied to front end delay means 210, which is the same as front end delay means 10 shown in FIG. 4A, except that front end delay means 210 comprises 64 groups of shift registers, one group serving the samples from each of the respective input lines. The delayed samples are applied respectively to 64 banks of output transfer gates 212, which correspond to the output gates 12 shown in FIG. 4A. The threshold detector 214 corresponds to the threshold detector 14 shown in FIG. 4A. In the same manner, register 216 and AND gate 218 correspond, respectively, to register 16 and AND gate 18; however, a 4 × 64 memory means 217 must be interposed between register 216 and AND gate 218 to accommodate the 64 multiplexed channels. The output of memory means 217 is recirculated through register 216. In other words, each 4-bit contents of the shift register 216 is written into the memory means 217 following each phase of the 512 KHz clock with the last 4-bit sequence in memory means 217 being reentered into shift register 216. It will therefore be appreciated that the output of AND gate 218 provides an output indicating that four successive voice samples from the same voice channel have exceeded the particular adaptive threshold level pertaining to that particular voice channel. The output of the AND gate 218 is applied to a conventional demultiplexer 219 which triggers the proper one of the 64 one-shot means 220. The particular energized one-shot provides a gating signal which passes through conventional multiplexer 221 and energizes the proper group of output gate 212.

Figure 7B:
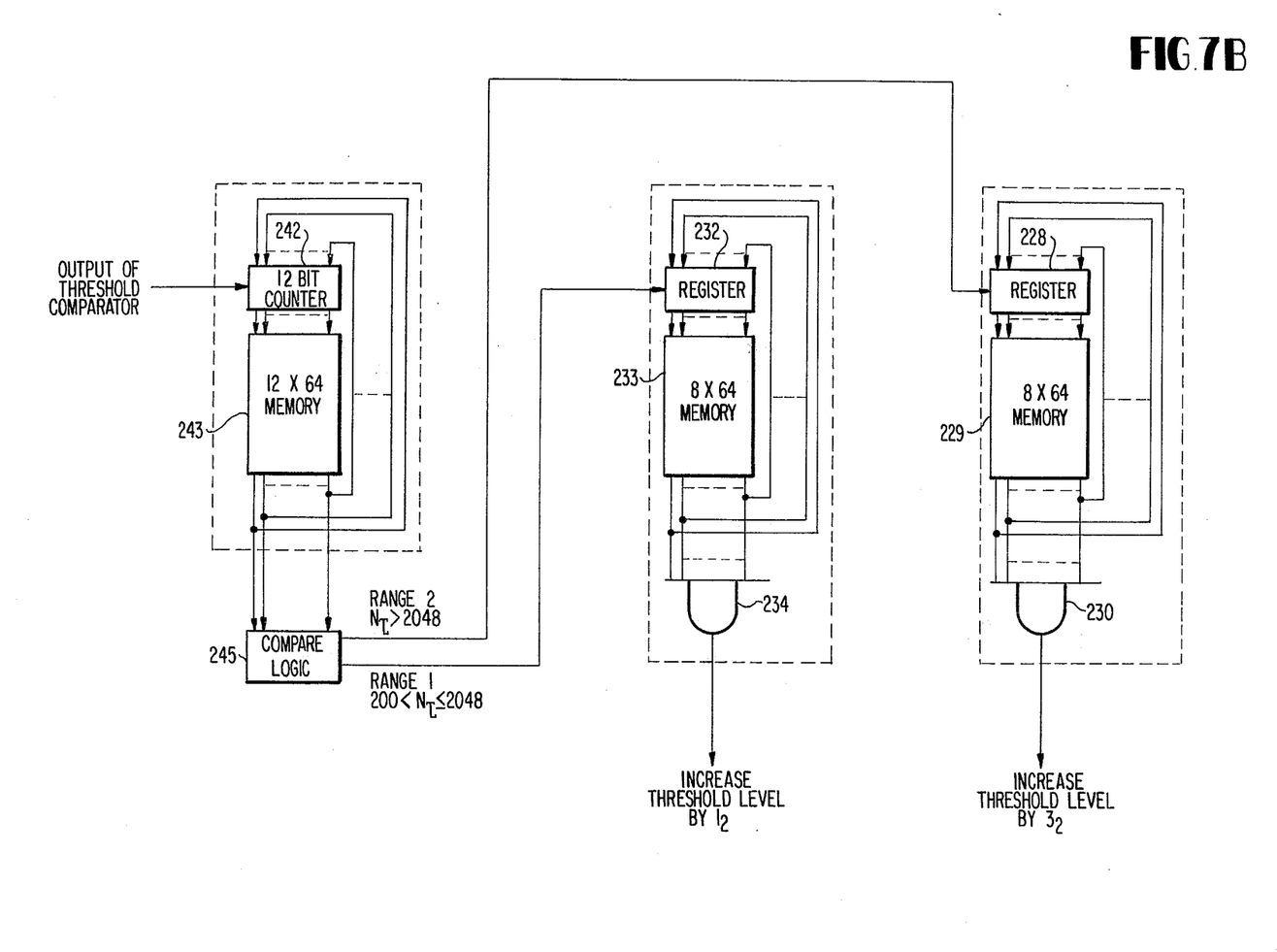

Referring to FIG. 7B, 12-bit counter 242 corresponds to counter 42 in FIG. 4B. A 12 × 64 memory means 243 cooperates with counter 242 and is capable of storing 64 12-bit numbers therein. The reading and writing of memory means 243 is controlled by the 64 phases of the 8 KHz clock. After each phase of the clock, the number presently in counter 242 is applied back into the memory 243, and the number entered into the memory means 243 64 phases earlier is read out of the memory means and entered into counter 242. In this manner, the counter 242 always contains a count which corresponds to the particular channel which originally carried the voice sample presently being tested. The compare logic 245 corresponds to the comparators 44 and 46 and AND gate 48 of FIG. 4B. The compare logic 245 is shared by all channels in the multiplexing operation. The range 1 output from compare logic 245 is applied to register 232 which corresponds to the 8-bit shift register 32 shown in FIG. 4B. The range 2 output from compare logic 245 is applied to register 228 which corresponds to 8-bit shift register 28. An 8 × 64 memory means 233 cooperates with register 232, while an 8 × 64 memory means 229 cooperates with register 228. The outputs of memory means 233 and 229 are recirculated through their corresponding registers 232 and 228 in the same manner as the outputs of memory means 243 are recirculated through its corresponding counter 242. The 8-bit output of memory means 233 is applied to AND gate 234, and the 8-bit output of memory means 229 is applied to AND gate 230. AND gates 234 and 230 correspond to AND gates 34 and 30, respectively, in FIG. 4B. Thus, the output of AND gate 234 is the increase threshold by $1_2$ command, while the output of AND gate 230 is the increase threshold by $3_2$ command.

Figure 7C:
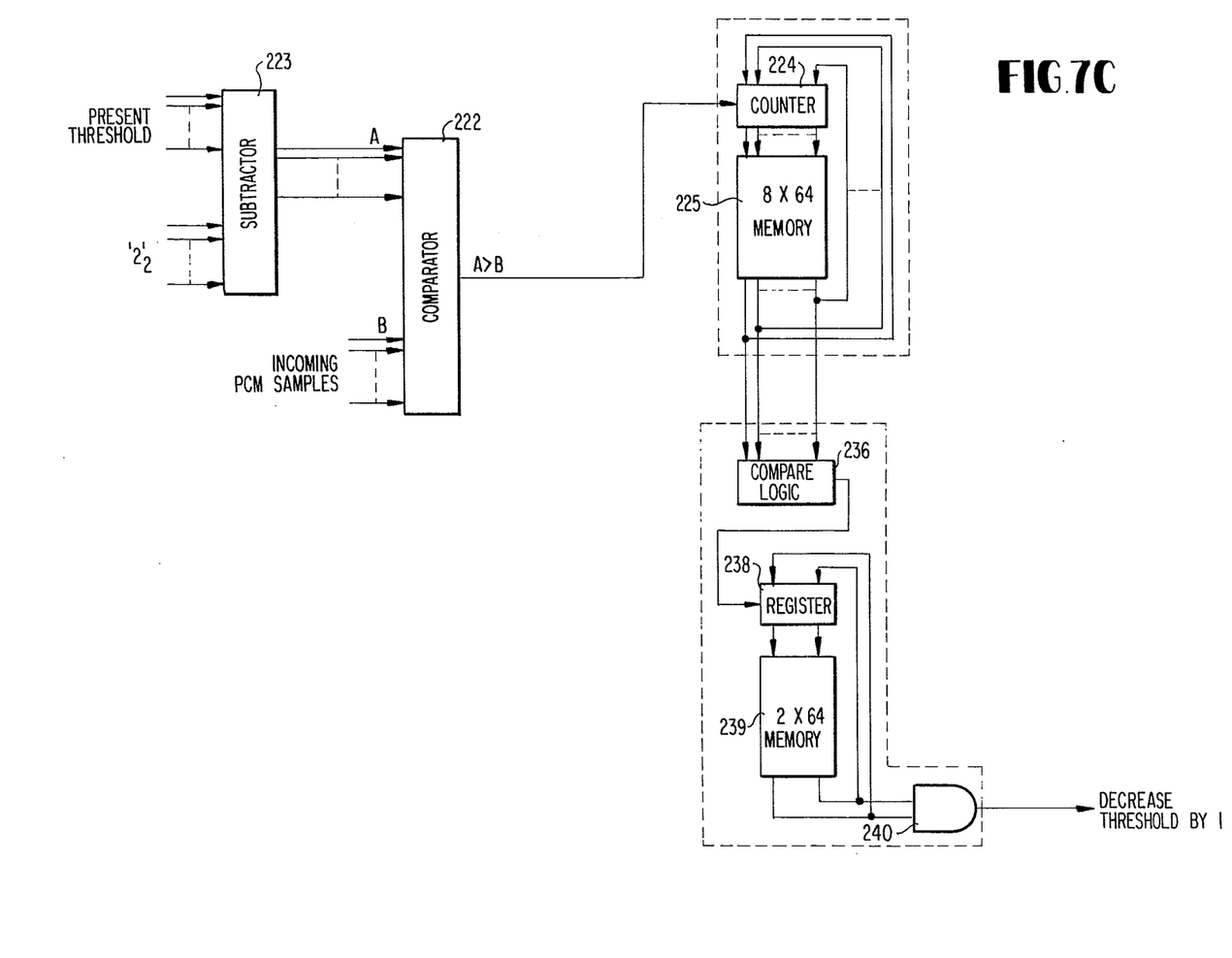

The circuitry necessary to decrease the threshold is shown in FIG. 7C. Subtractor 223 and comparator 222 compare the incoming PCM samples to a level $2_2$ units below the present threshold. Thus, subtractor 223 and comparator 222 are identical to subtractor 23 and comparator 22 in FIG. 4B. The output of comparator 222 is connected to 8-bit counter 224 corresponding to counter 24 in FIG. 4B. An 8 × 64 memory means 225 cooperates with counter 224 in a manner previously explained to accommodate the multiplexed channels. The 8-bit output from memory means 225 is applied to compare logic 236 corresponding to the comparator 36 in FIG. 4B. If the output from memory means 225 is less than 200, compare logic 236 will apply a binary 1 to the 2-bit shift register 238. Shift register 238 corresponds to shift register 38 but, again, cooperates with a 2 × 64 memory means 239 which recirculates its output through shift register 238. AND gate 240 corresponding to AND gate 40, detects when two consecutive binary one's have occurred in the output of compare logic 36 for a particular channel under test, and provides the output decrease threshold by $1_2$ command.

Figure 7D:
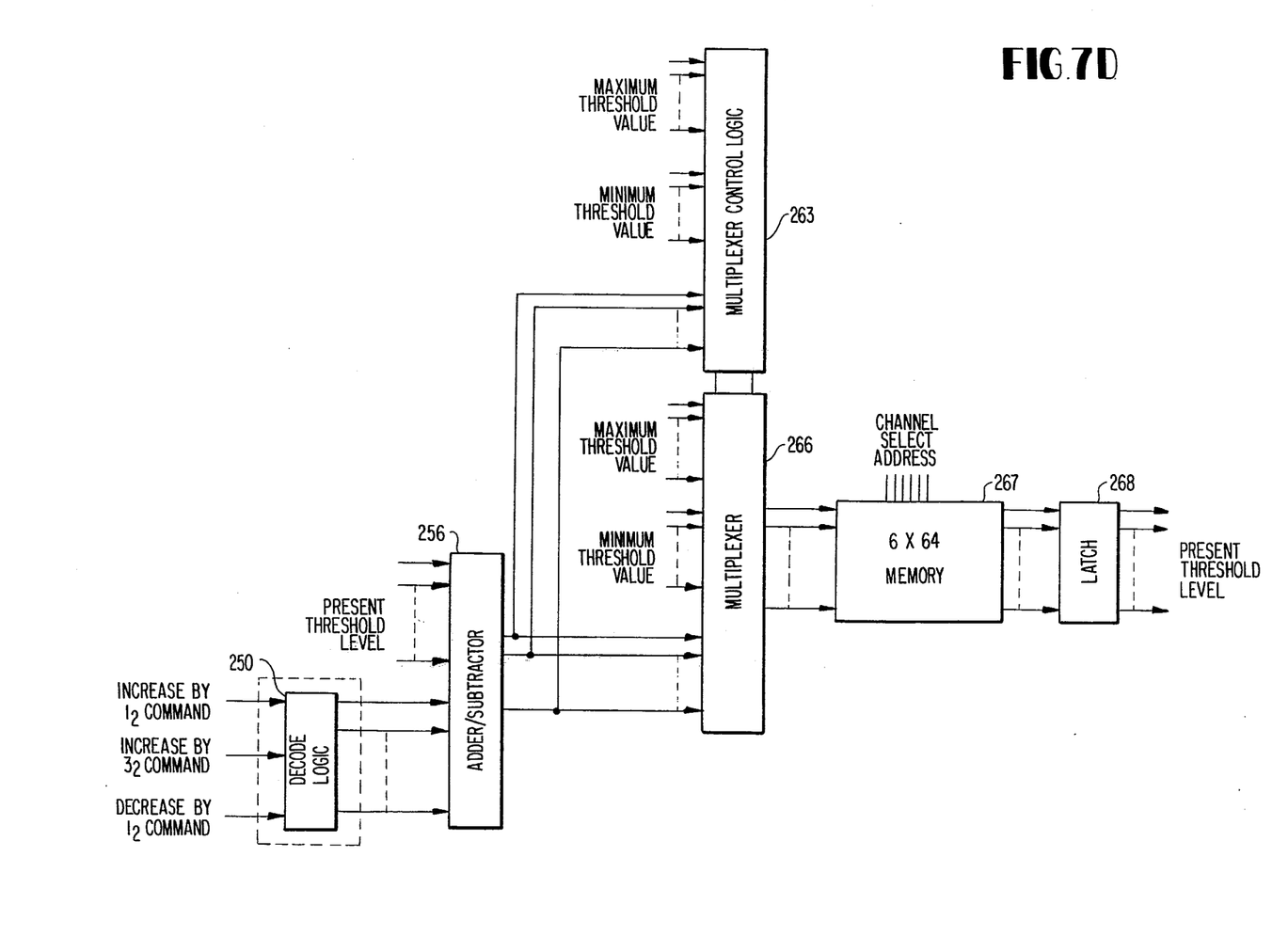

Referring to FIG. 7D, the command signals for increasing and decreasing the threshold level are fed to the decode logic 250 which provides the appropriate binary inputs to adder/subtractor 256. The outputs of adder/subtractor 256 are applied to a multiplexer control logic 263 and the multiplexer 266. The multiplexer control logic 263 corresponds to the comparators 58 and 60, AND gate 62, and the decoder 64 of FIG. 4B. The 6 × 64 memory means 267 stores the threshold level for all 64 channels. The output of this memory means is strobed into the latch 268 when the corresponding PCM samples arrive at the threshold comparator 214.

From the foregoing, it will be apparent that the embodiments shown are only exemplary and that various modifications can be made in construction and arrangement within the scope of the invention as defined in the appended claims.

What is claimed is:

1. A voice switch of the type comprising means for storing a value representing a threshold level, threshold detector means for providing an output threshold signal each time a voice sample applied thereto exceeds a threshold level applied thereto, means for connecting said value stored in said storing means to said threshold detector means, means for connecting periodic samples of a signal on a channel adapted to carry voice signals to said threshold detector, accumulator means for accumulating over a predetermined period of time a number representing the number of times that voice samples exceeds said threshold value, adder means having first and second inputs for adding the values applied to said first and second inputs and providing the sum at an output, said first input being connected to the output of said storing means, and means responsive to the output from said adder and to maximum and minimum threshold values for entering the output sum into said storing means if said output sum is between said maximum and minimum threshold values, the improvement comprising:

a. first comparison means for comparing said accumulated number with first and second numbers which define predetermined ranges of the number of times that voice samples exceed said threshold within a given time period, said first comparison means providing a value representing a first positive increment to the second input of said adder means when said accumulated number is greater than said first number but less than or equal to said second number for a predetermined number of consecutive predetermined periods of time and for providing a value representing a second positive increment to the second input of said adder means when said accumulated number is greater than said second number for a predetermined number of consecutive periods of time, b. second comparison means for comparing an incoming voice sample to a predetermined level below the values stored in said storing means and providing an output when said incoming voice sample is less than said predetermined lower level below the level stored in said storing means, and c. accumulator and comparison means for accumulating the output of said second comparison means over said predetermined period of time and providing a value representing a negative increment to said second input of said adder means when the accumulated number from said second comparison means is less than said first number for a predetermined number of consecutive periods of time.

2. A voice switch as claimed in claim 1, wherein said voice samples are digitally encoded samples of said signal on a channel adapted to carry voice signals.

3. A voice switch as claimed in claim 2, wherein said maximum and minimum threshold values are fixed values.

4. A voice switch as claimed in claim 3, wherein said first comparison means comprises a first comparator for comparing said accumulated number with said first number and providing an output when said accumulated number is greater than said first number, a second comparator for comparing said accumulated number with said second number and providing a first output when said accumulated number is less than or equal to said second number and a second output when said accumulated number is greater than said second number, a first AND gate receiving the output of said first comparator and said first output of said second comparator and providing an output, a first shift register connected to receive the output of said first AND gate, a second AND gate connected to receive as inputs the output of each stage of said first shift register, a second shift register connected to said second output of said second comparator, and a third AND gate connected to receive as inputs the output of each stage of said second shift register, the output of said second AND gate being a command for said first positive increment and the output of said third AND gate being a command for said second positive increment.

5. A voice switch as claimed in claim 4, wherein said second comparison means comprises subtractor means having first and second inputs for subtracting the values applied to said first and second inputs and providing a difference at an output, said first input being connected to the output of said storing means and said second input being connected to receive a predetermined fixed value, and a third comparator connected to receive the difference output from said subtractor as one input and connected to receive periodic samples of a signal on a channel adapted to carry voice signals at a second input for providing an output each time the difference signal from said subtractor is greater than the voice sample applied thereto.

6. A voice switch as claimed in claim 5, wherein said accumulator and comparison means comprises a counter connected to count the number of times the output of said subtractor exceeds the level of said voice samples over a predetermined period of time, a fourth comparator for comparing the output of said counter with a third number and providing an output when the count in said counter is less than said third number, a third shift register connected to receive the output of said fourth comparator, and a fourth AND gate connected to receive as inputs the output of each stage of said third shift register, the output of said fourth AND gate being a command for said negative increment.

7. A voice switch as claimed in claim 6, adapted to operate on multi-channel voice data further comprising first recirculating memory means connected between said accumulator means and said first comparison means for storing accumulated numbers for each channel for said multi-channel voice data, second recirculating memory means connected between said first shift register and said second AND gate for storing the output of said first register for each channel of said multi-channel voice data, third recirculating memory means connected between said second shift register and said third AND gate for storing the output of said second shift register for each channel of said multi-channel voice data, fourth recirculating memory means connected between said counter and said fourth comparator for storing the output of said counter for each channel of said multi-channel voice data, and fifth recirculating memory means connected between said third shift register and said fourth AND gate for storing the output of said third shift register for each channel of said multi-channel voice data.

8. A voice switch as claimed in claim 7, further comprising timing means to said accumulator means, said counter and each of said recirculating memory means, said timing means having a period equal to said predetermined period of time times the number of channels of said multi-channel voice data and a number of phases equal to the number of channels of said multi-channel voice data.

* * * * *